United States Patent
Ekanadham et al.

(10) Patent No.: US 8,943,299 B2
(45) Date of Patent: Jan. 27, 2015

(54) OPERATING A STACK OF INFORMATION IN AN INFORMATION HANDLING SYSTEM

(75) Inventors: Kattamuri Ekanadham, Mohegan Lake, NY (US); Brian R. Konigsburg, Austin, TX (US); David S. Levitan, Austin, TX (US); Jose E. Moreira, Irvington, NY (US); David Mui, Round Rock, TX (US); Il Park, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1008 days.

(21) Appl. No.: 12/817,609

(22) Filed: Jun. 17, 2010

(65) Prior Publication Data

US 2011/0314259 A1    Dec. 22, 2011

(51) Int. Cl.
*G06F 9/30* (2006.01)
(52) U.S. Cl.
CPC ......................... *G06F 9/30* (2013.01)
USPC .......................................................... 712/233
(58) Field of Classification Search
CPC .......................................................... G06F 9/30
See application file for complete search history.

(56) References Cited

U.S. PATENT DOCUMENTS

| | | | |
|---|---|---|---|
| 6,633,974 B1 | 10/2003 | Sinharoy | |
| 6,848,044 B2 | 1/2005 | Eisen et al. | |
| 6,910,124 B1 | 6/2005 | Sinharoy | |
| 2006/0294346 A1 | 12/2006 | Stempel et al. | |
| 2007/0204142 A1 | 8/2007 | Dieffenderfer et al. | |
| 2009/0070561 A1 | 3/2009 | Alexander | |
| 2009/0094444 A1* | 4/2009 | Dieffenderfer et al. | ....... 712/228 |
| 2009/0198959 A1 | 8/2009 | Hall et al. | |

* cited by examiner

*Primary Examiner* — Andrew Caldwell
*Assistant Examiner* — John Lindlof
(74) *Attorney, Agent, or Firm* — James L. Baudino (57) ABSTRACT

A pointer is for pointing to a next-to-read location within a stack of information. For pushing information onto the stack: a value is saved of the pointer, which points to a first location within the stack as being the next-to-read location; the pointer is updated so that it points to a second location within the stack as being the next-to-read location; and the information is written for storage at the second location. For popping the information from the stack: in response to the pointer, the information is read from the second location as the next-to-read location; and the pointer is restored to equal the saved value so that it points to the first location as being the next-to-read location.

23 Claims, 6 Drawing Sheets

| | Row | Addr | Pred | EffAddr | LinkPtr |
|---|---|---|---|---|---|
| Top → | 0 | A | 7 | 0x200 | 7 |
| | 1 | B | 0 | 0x250 | 0 |
| | 2 | C | 0 | 0x280 | 0 |
| Free → | 3 | | | 0x520 | 1 |
| | 4 | | | 0x550 | 0 |
| | 5 | | | 0x5B0 | 2 |
| | 6 | | | | |
| | 7 | | | | |

| Row | Addr | Pred |
|---|---|---|
| 0 | A | 7 |
| 1 | B | 0 |
| 2 | C | 0 |
| 3 | | |
| 4 | | |
| 5 | | |
| 6 | | |
| 7 | | |

| EffAddr | LinkPtr |
|---|---|
| 0x200 | 7 |
| 0x250 | 0 |
| 0x280 | 0 |
| 0x520 | 1 |
| 0x550 | 0 |
| 0x5B0 | 2 |
| | |
| | |

Top → 0
Free → 3

*FIG. 3A*

| Row | Addr | Pred |
|---|---|---|
| 0 | A | 7 |
| 1 | B | 0 |
| 2 | C | 0 |
| 3 | | |
| 4 | | |
| 5 | | |
| 6 | | |
| 7 | | |

| EffAddr | LinkPtr |
|---|---|
| 0x200 | 7 |
| 0x250 | 0 |
| | |
| | |
| | |
| | |
| | |
| | |

Top → 0
Free → 1

*FIG. 3B*

| Row | Addr | Pred |
|---|---|---|
| 0 | A | 7 |
| 1 | B | 0 |
| 2 | C | 0 |
| 3 | | |
| 4 | | |
| 5 | | |
| 6 | | |
| 7 | | |

Top → 0
Free → 3

| EffAddr | LinkPtr |
|---|---|
| Push A | 7 |
| Push B | 0 |
| BC | 1 |
| Pop (B) | 1 |
| Push C | 0 |
| Pop (C) | 2 |
| | |
| | |

*FIG. 4A*

| Row | Addr | Pred |
|---|---|---|
| 0 | A | 7 |
| 1 | B | 0 |
| 2 | C | 0 |
| 3 | | |
| 4 | | |
| 5 | | |
| 6 | | |
| 7 | | |

Top → 1
Free → 2

| EffAddr | LinkPtr |
|---|---|
| Push A | 7 |
| Push B | 0 |
| BC | 1 |
| | |
| | |
| | |
| | |
| | |

*FIG. 4B*

| Row | Addr | Pred |
|---|---|---|
| 0 | A | 7 |
| 1 | B | 0 |
| 2 | C | 0 |
| 3 | | |
| 4 | | |
| 5 | | |
| 6 | | |
| 7 | | |

Free → 2
Top → 7

| EffAddr | LinkPtr |
|---|---|
| Push A | 7 |
| Push B | 0 |
| BC | 1 |
| Pop (B) | 1 |
| Pop (A) | 0 |
| | |
| | |
| | |

FIG. 4C

| Row | Addr | Pred |
|---|---|---|
| 0 | A | 7 |
| 1 | B | 0 |
| 2 | D | 7 |
| 3 | | |
| 4 | | |
| 5 | | |
| 6 | | |
| 7 | | |

Top → 2
Free → 3

| EffAddr | LinkPtr |
|---|---|
| Push A | 7 |
| Push B | 0 |
| BC | 1 |
| Pop (B) | 1 |
| Pop (A) | 0 |
| Push D | 7 |
| | |
| | |

FIG. 4D

| Row | Addr | Pred |
|---|---|---|
| 0 | A | 7 |
| 1 | B | 0 |
| 2 | C | 0 |
| 3 | | |
| 4 | | |
| 5 | | |
| 6 | | |
| 7 | | |

| EffAddr | LinkPtr |
|---|---|
| Push A | 7 |
| BC | 0 |
| Push B | 0 |
| Pop (B) | 1 |
| Push C | 0 |
| | |
| | |
| | |

Top → 2
Free → 3

FIG. 5A

| Row | Addr | Pred |
|---|---|---|
| 0 | A | 7 |
| 1 | B | 0 |
| 2 | C | 0 |
| 3 | | |
| 4 | | |
| 5 | | |
| 6 | | |
| 7 | | |

| EffAddr | LinkPtr |
|---|---|
| Push A | 7 |
| BC | 0 |
| | |
| | |
| | |
| | |
| | |
| | |

Top → 0
Free → 1

FIG. 5B

| Row | Addr | Pred |
|-----|------|------|
| 0 | A | 7 |
| 1 | D | 7 |
| 2 | C | 0 |
| 3 | | |
| 4 | | |
| 5 | | |
| 6 | | |
| 7 | | |

Top → row 1
Free → row 2

| EffAddr | LinkPtr |
|---------|---------|
| Push A | 7 |
| BC | 0 |
| Pop (A) | 0 |
| Push D | 7 |
| | |
| | |
| | |
| | |

*FIG. 5C*

OPERATING A STACK OF INFORMATION IN AN INFORMATION HANDLING SYSTEM

BACKGROUND

The disclosures herein relate in general to information handling systems, and in particular to operating a stack of information in an information handling system.

In response to a branch conditional instruction, an information handling system may speculatively branch its processing to a predicted one of two or more possible target sequences of instructions, before the information handling system actually determines whether the predicted sequence of instructions is in fact the correct sequence. If the information handling system later determines that the speculative branch is correctly predicted, then the information handling system continues processing the predicted sequence of instructions. By comparison, if the information handling system later determines that the speculative branch is mispredicted, then the information handling system: (a) stops (e.g., cancels) processing the predicted sequence of instructions; (b) recovers from the misprediction by reversing certain types of effects of processing the predicted sequence of instructions; and (c) processes the correct sequence of instructions. If information was pushed onto (or popped from) a stack as a result of the misprediction, then such recovery may consume additional time. Thus, a need has arisen for an information handling system that reduces a time for such recovery.

BRIEF SUMMARY

A pointer is for pointing to a next-to-read location within a stack of information. For pushing information onto the stack: a value is saved of the pointer, which points to a first location within the stack as being the next-to-read location; the pointer is updated so that it points to a second location within the stack as being the next-to-read location; and the information is written for storage at the second location. For popping the information from the stack: in response to the pointer, the information is read from the second location as the next-to-read location; and the pointer is restored to equal the saved value so that it points to the first location as being the next-to-read location.

DETAILED DESCRIPTION

Figure 1:
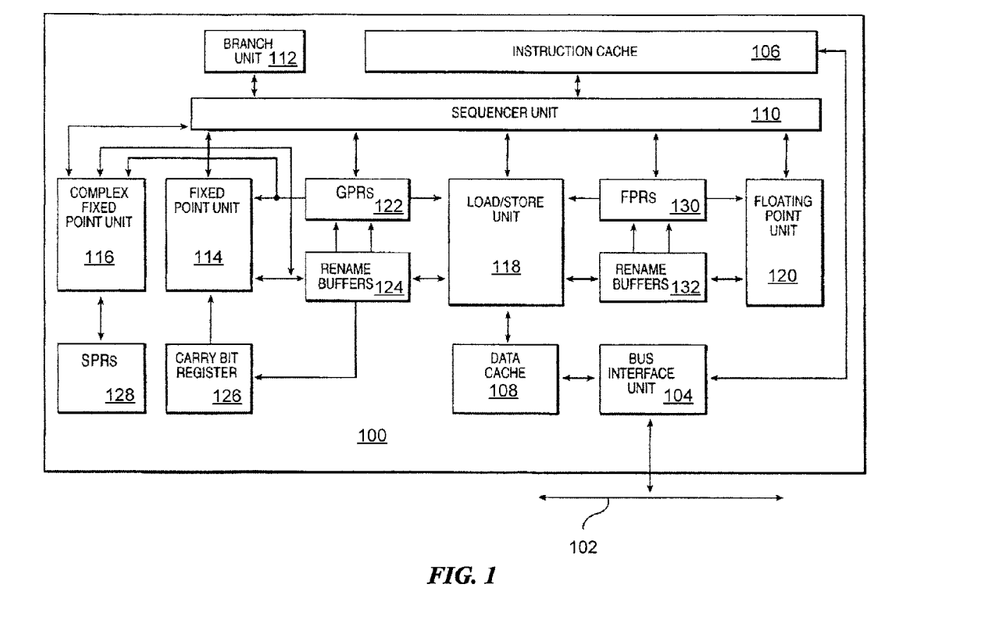
FIG. 1 is a block diagram of an information handling system of the illustrative embodiment.

FIG. 1 is a block diagram of an information handling system 100 of the illustrative embodiment. In the example of FIG. 1, the system 100 is a single integrated circuit superscalar microprocessor. Accordingly, as discussed hereinbelow, the system 100 includes various units, registers, buffers, memories, and other sections, all of which are formed by integrated circuitry. Also, in the illustrative embodiment, the system 100 operates according to reduced instruction set computing ("RISC") techniques. As shown in FIG. 1, a system bus 102 is connected to a bus interface unit ("BIU") 104 of the system 100. The BIU 104 controls the transfer of information between the system 100 and the system bus 102.

The BIU 104 is connected to an instruction cache 106 and to a data cache 108 of the system 100. The instruction cache 106 outputs instructions to a sequencer unit 110. In response to such instructions from the instruction cache 106, the sequencer unit 110 selectively outputs instructions to other execution circuitry of the system 100.

In addition to the sequencer unit 110, in the illustrative embodiment, the execution circuitry of the system 100 includes multiple execution units, namely a branch unit 112, a fixed point unit ("FXU") 114, a complex fixed point unit ("CFXU") 116, a load/store unit ("LSU") 118 and a floating point unit ("FPU") 120. The FXU 114, CFXU 116 and LSU 118 receive their source operand information from general purpose architectural registers ("GPRs") 122 and fixed point rename buffers 124. Moreover, the FXU 114 receives a "carry bit" from a carry bit ("CA") register 126. The FXU 114, CFXU 116 and LSU 118 output results (destination operand information) of their operations for storage at selected entries in the fixed point rename buffers 124. Also, the CFXU 116 receives and outputs source operand information and destination operand information to and from special purpose registers ("SPRs") 128.

The FPU 120 receives its source operand information from floating point architectural registers ("FPRs") 130 and floating point rename buffers 132. The FPU 120 outputs results (destination operand information) of its operation for storage at selected entries in the floating point rename buffers 132.

In response to a LOAD instruction, the LSU 118 receives (i.e. reads) information from the data cache 108 and copies (i.e. writes) such information into selected ones of the rename buffers 124 and 132. If such information is not already stored in the data cache 108, then the data cache 108 receives such information from a system memory (not shown in FIG. 1) through the system bus 102 and the BIU 104. Moreover, the data cache 108 is able to output (i.e. write) information from the data cache 108 into the system memory through the BIU 104 and the system bus 102. In response to a STORE instruction, the LSU 118 receives information from a selected one of the GPRs 122 and FPRs 130 and copies such information into the data cache 108.

The sequencer unit 110 receives and outputs information to and from the GPRs 122 and FPRs 130. From the sequencer unit 110, the branch unit 112 receives instructions and signals indicating a present state of the system 100. In response to such instructions and signals, the branch unit 112 outputs (to the sequencer unit 110) signals indicating suitable memory addresses that store a sequence of instructions for execution by the system 100. In response to such signals from the branch unit 112, the sequencer unit 110 receives the indicated sequence of instructions from the instruction cache 106. If one or more of the sequence of instructions is not stored in the instruction cache 106, then the instruction cache 106 receives such instructions from the system memory through the system bus 102 and the BIU 104.

In response to the instructions received from the instruction cache 106, the sequencer unit 110 selectively dispatches the instructions to selected ones of the execution units 112, 114, 116, 118 and 120. Each execution unit executes one or more instructions of a particular class of instructions. For example, the FXU 114 executes a first class of fixed point mathematical operations on source operands, such as addition, subtraction, ANDing, ORing and XORing. The CFXU 116 executes a second class of fixed point operations on source operands, such as fixed point multiplication and division. The FPU 120 executes floating point operations on source operands, such as floating point multiplication and division.

As information is stored at a selected one of the rename buffers 124, such information is associated with a storage location (e.g., one of the GPRs 122 or the CA register 126) as specified by the instruction for which the selected rename buffer is allocated. Information stored at a selected one of the rename buffers 124 is copied to its associated one of the GPRs 122 (or the CA register 126) in response to signals from the sequencer unit 110. The sequencer unit 110 directs such copying of information (stored at a selected one of the rename buffers 124) in response to "completing" the instruction that generated the information. Such copying is called "writeback."

As information is stored at a selected one of the rename buffers 132, such information is associated with one of the FPRs 130. Information stored at a selected one of the rename buffers 132 is copied to its associated one of the FPRs 130 in response to signals from the sequencer unit 110. The sequencer unit 110 directs such copying of information (stored at a selected one of the rename buffers 132) in response to "completing" the instruction that generated the information.

The system 100 processes multiple instructions simultaneously at various ones of the execution units 112, 114, 116, 118 and 120. Accordingly, each instruction is processed by the system 100 as a sequence of stages, which are processable in parallel with stages of other instructions. Such a technique is called "pipelining" In the illustrative embodiment, an instruction is processable as six stages, namely fetch, decode, dispatch, execute, completion, and writeback.

In the fetch stage, the sequencer unit 110 selectively receives (from the instruction cache 106) one or more instructions ("fetched instructions") from one or more memory addresses that store the sequence of instructions discussed hereinabove in connection with the branch unit 112 and the sequencer unit 110.

In the decode stage, the sequencer unit 110 decodes one or more of the fetched instructions.

In the dispatch stage, the sequencer unit 110 selectively dispatches one or more of the decoded instructions to selected (in response to the decoding in the decode stage) ones of the execution units 112, 114, 116, 118 and 120 after reserving rename buffer entries for the dispatched instructions' results (destination operand information). In the dispatch stage, the system 100 supplies operand information to the selected execution units for the dispatched instructions. The system 100 dispatches instructions in order of their programmed sequence.

In the execute stage, the execution units 112, 114, 116, 118 and 120 execute the dispatched instructions and output results (destination operand information) of their operations for storage at selected entries in the rename buffers 124 and 132 as discussed hereinabove. In this manner, the system 100 is able to execute instructions out-of-order relative to their programmed sequence.

In the completion stage, the sequencer unit 110 indicates that an instruction is "complete." The system 100 "completes" instructions in order of their programmed sequence.

In the writeback stage, the sequencer unit 110 directs the copying of information from the rename buffers 124 and 132 to the GPRs 122 and FPRs 130, respectively. Likewise, in the writeback stage of a particular instruction, the system 100 updates its architectural states in response to the particular instruction. The system 100 processes the respective "writeback" stages of instructions in order of their programmed sequence. The system 100 advantageously merges an instruction's completion stage and writeback stage in specified situations.

In the illustrative embodiment, a representative instruction consumes one machine cycle per stage of instruction processing. Nevertheless, some instructions (e.g., complex fixed point instructions executed by the CFXU 116) may consume more than one cycle. Accordingly, a variable delay may occur between a particular instruction's execution stage and completion stage, in response to a variation in time consumed by preceding instructions.

Figure 2:
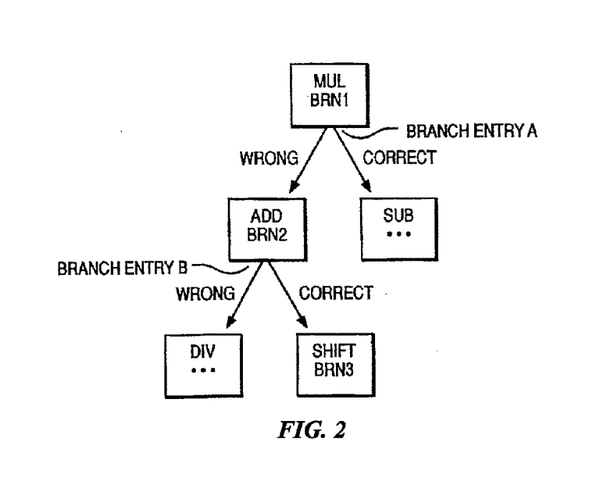
FIG. 2 is a conceptual illustration of example instructions processed by the information handling system of FIG. 1.

FIG. 2 is a conceptual illustration of example instructions processed by the system 100. The system 100 supports speculative processing of instructions. For example, in response to a branch conditional instruction, the system 100 speculatively branches its processing to a predicted one of two or more possible target sequences of instructions, before the system 100 actually determines whether the predicted sequence of instructions is in fact the correct sequence.

Accordingly, if a branch condition of the branch conditional instruction is subject to results of preceding instructions that the system 100 has not yet finished executing, then the system 100: (a) predicts a state of the branch condition (e.g., in response to branch history information stored by the system 100); and (b) in response to such prediction, speculatively processes the predicted sequence of instructions, before the system 100 finishes execution of such preceding instructions. After the system 100 finishes execution of such preceding instructions, the system 100 determines an actual state of the branch condition, and the branch unit 112 executes the branch conditional instruction. If the actual state is the same as the predicted state, then the predicted state is correct. Conversely, if the actual state is different from the predicted state, then the predicted state is wrong (e.g., mispredicted).

If the speculative branch is correctly predicted, then the predicted sequence of instructions is the correct sequence, and the system 100 continues processing the predicted sequence of instructions. By comparison, if the speculative branch is mispredicted, then the predicted sequence of instructions is not the correct sequence, and the system 100: (a) stops (e.g., cancels) processing the predicted sequence of instructions; (b) recovers from the misprediction by reversing certain types of effects of processing the predicted sequence of instructions; and (c) processes the correct sequence of instructions in response to the actual state of the branch condition.

As shown in the example of FIG. 2, the system 100: (a) processes a multiply instruction ("MUL"); and (b) at a branch entry A, speculatively branches its processing in response to a first branch conditional instruction ("BRN1"), such that the system 100 branches its processing from BRN1 to an add instruction ("ADD"). Within an effective address table ("EAT") of an instruction fetch unit in the sequencer unit 110, the sequencer unit 110 stores an effective address of the target ADD, to which the system 100 speculatively branches its processing in response to BRN1.

At a branch entry B, the system 100 speculatively branches its processing in response to a second branch conditional instruction ("BRN2"), such that the system 100 speculatively branches its processing from BRN2 to a divide instruction ("DIV"). Within the EAT, the sequencer unit 110 stores an effective address of the target DIV, to which the system 100 speculatively branches its processing in response to BRN2. Accordingly, the system 100 is able to speculatively branch its processing in response to a branch instruction (e.g., BRN2), even if the system 100 has not yet determined an actual state of a preceding branch instruction's (e.g., BRN1's) branch condition. For example, the system 100 is able to speculatively branch its processing in response to multiple branch instructions, before determining the actual states of any of such branch instructions' respective branch conditions.

Eventually, the system 100 fully executes BRN2, such that the system 100 determines the actual state of BRN2's branch condition. In the example of FIG. 2, the actual state of BRN2's branch condition is different from the predicted state of BRN2's branch condition, such that: (a) the predicted state is wrong; and (b) the predicted sequence of instructions (e.g., the DIV instruction to which the system 100 speculatively branched its processing) is incorrect. In response to determining that the predicted state of BRN2's branch condition is wrong, the system 100: (a) cancels processing the DIV instruction; (b) recovers from the misprediction by reversing certain types of effects of processing the DIV instruction; and (c) processes the correct sequence of instructions in response to the actual state of BRN2's branch condition. In the example of FIG. 2, the correct sequence (in response to the actual state of BRN2's branch condition) includes a shift instruction ("SHIFT") and a third branch instruction ("BRN3"). Within the EAT, the sequencer unit 110 stores an effective address of the target SHIFT, to which the system 100 branches its processing in response to the actual state of BRN2's branch condition.

Accordingly, the system 100 recovers from mispredicting the state of a branch instruction's (e.g., BRN2's) branch condition, even if the system 100 has not yet determined an actual state of a preceding branch instruction's (e.g., BRN1's) branch condition. To start processing the correct sequence of instructions, the system 100 is not required to finish execution of all instructions preceding the branch instruction. For example, the system 100 is not required to "complete" the branch instruction before the system 100 starts processing the correct sequence of instructions.

In the example of FIG. 2, the system 100 starts processing the SHIFT and BRN3 instructions before the system 100 finishes execution of the preceding MUL. For example, the system 100 is able to dispatch additional instructions to the CFXU 116, and the system 100 is able to selectively cancel execution of DIV within the CFXU 116, without necessarily cancelling execution of MUL within the CFXU 116.

Eventually, the system 100 fully executes BRN1, such that the system 100 determines the actual state of BRN1's branch condition. In the example of FIG. 2, the actual state of BRN1's branch condition is different from the predicted state of BRN1's branch condition, such that: (a) the predicted state is wrong; and (b) the predicted sequence of instructions (e.g., the ADD, BRN2, DIV, SHIFT and BRN3 instructions to which the system 100 speculatively branched its processing) is incorrect. In response to determining that the predicted state of BRN1's branch condition is wrong, the system 100: (a) cancels processing the ADD, BRN2, SHIFT and BRN3 instructions; (b) recovers from the misprediction by reversing certain types of effects of processing the ADD, BRN2, SHIFT and BRN3 instructions; and (c) processes the correct sequence of instructions in response to the actual state of BRN1's branch condition. In the example of FIG. 2, the correct sequence (in response to the actual state of BRN1's branch condition) includes a subtraction instruction ("SUB"). Within the EAT, the sequencer unit 110 stores an effective address of the target SUB, to which the system 100 branches its processing in response to the actual state of BRN1's branch condition. Notably, the system 100 already cancelled processing of the DIV instruction in response to determining that the predicted state of BRN2's branch condition was wrong.

The branch unit 112 includes a link stack for storing a stack of information. The fixed point unit 114 includes circuitry for determining: (a) whether the actual state of a branch condition is different from the predicted state of such branch condition; and (b) whether a predicted effective address of the branch's target is wrong. In response to the fixed point unit 114 determining that the predicted state of such branch condition is wrong or that the predicted effective address of the branch's target is wrong, the branch unit 112 manages a process to recover from such misprediction (e.g., by outputting suitable commands and related information to the sequencer unit 110).

Figure 3A:
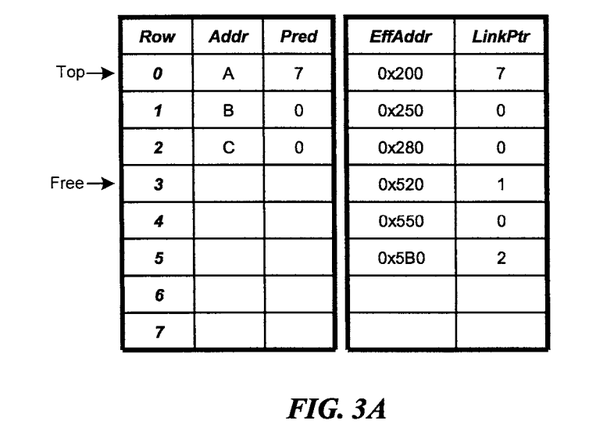
FIG. 3A is a conceptual illustration of a link stack of the information handling system of FIG. 1, storing first information in a first example operation.

FIG. 3A is a conceptual illustration of an example link stack of the branch unit 112, storing first information in a first example operation of the system 100. The branch unit 112 stores a first pointer ("Top"), which points to a next-to-read location within the link stack (e.g., highest valid row of the link stack). For example, the Top row is a location where the branch unit 112 would read (from the link stack) an operand of a next pop operation. Also, the branch unit 112 stores a second pointer ("Free"), which points to a next-to-write location within the link stack. For example, the Free row is a location where the branch unit 112 would write (for storage within the link stack) an operand of a next push operation.

Within the link stack, each row includes a respective: (a) address field ("Addr"), which stores an operand of a push operation; and (b) its associated index field ("Pred"), which stores a pointer that points to a predecessor Top row. In an alternative embodiment, the branch unit 112 stores Addr and Pred in separate memory arrays to increase speed of writing to (and reading from) them.

In response to the sequencer unit 110 fetching a branch (or a push, a pop or other type of control dependent) instruction, the system 100 saves a then-current value of Top in association with such instruction, without saving a duplicate copy of the entire link stack. As shown in FIG. 3A, the system 100 saves such value of Top ("LinkPtr") in association with such instruction's effective address ("EffAddr"), within a table of the branch unit 112. In a first alternative embodiment, the system 100 saves the LinkPtr and its associated EffAddr within the EAT of the instruction fetch unit in the sequencer unit 110. In a second alternative embodiment, the system 100 saves the LinkPtr together with such instruction, as such instruction is processed by the system 100 through the sequence of pipeline stages discussed hereinabove in connection with FIG. 1.

In response to the fixed point unit 114 determining that the speculative branch is mispredicted (e.g., a predicted state of a branch condition is wrong for such instruction, or a predicted effective address of the branch's target is wrong for such instruction):

(a) the branch unit 112 restores Top to equal the LinkPtr saved in association with such instruction, without restoring a duplicate copy of the entire link stack, and without popping all information that was pushed (onto the link stack) as a result of such misprediction; and (b) the branch unit 112 restores Free to equal such restored Top+1, unless the mispredicted state of the branch condition was against taking such branch.

In the example of the illustrative embodiment, the branch unit 112 counts the rows with modulo 8 arithmetic (e.g., if Top=7, then Top+1=0).

For pushing information A onto the link stack ("Push A"), the branch unit 112: (a) writes A for storage (within the link stack) in Addr of the then-current Free row; (b) writes a then-current value of Top for storage (within the link stack) in Pred of the then-current Free row; (c) updates Top to equal a then-current value of Free; and (d) updates Free to equal such updated Top+1.

For popping information from the link stack ("Pop"), the branch unit 112: (a) reads Addr of the then-current Top row ("popped row"); and (b) updates Top to equal the value of such popped row's Pred.

Accordingly, referring again to FIG. 3A, in the first example operation, the system 100 processes a sequence of instructions that are stored at the following addresses.

| Address | Instruction |
|---------|-------------|
| 0x200   | Push A      |
| 0x250   | BC          |
| 0x280   | Push B      |
| 0x520   | Pop (B)     |
| 0x550   | Push C      |
| 0x5B0   | Pop (C)     |

In response to such processing, the branch unit 112 performs the following series of updates to Top and Free on an instruction-by-instruction basis, where initially: (a) Top=7; and (b) Free=0.

| Address | Instruction | Updates to Top and Free |
|---------|-------------|-------------------------|
| 0x200   | Push A      | Top = 0, Free = 1       |
| 0x250   | BC          | Top = 0, Free = 1       |
| 0x280   | Push B      | Top = 1, Free = 2       |
| 0x520   | Pop (B)     | Top = 0, Free = 2       |
| 0x550   | Push C      | Top = 2, Free = 3       |
| 0x5B0   | Pop (C)     | Top = 0, Free = 3       |

In response to the sequencer unit 110 fetching such instructions, the branch unit 112 saves a then-current (pre-updated) value of Top in association with such instructions' respective effective addresses, as shown in the EffAddr and LinkPtr columns of FIG. 3A.

Further, as shown in FIG. 3A:

(a) in response to processing the Push A instruction, the branch unit 112 writes A for storage in Addr of the row 0, and writes 7 as a then-current (pre-updated) value of Top for storage in Pred of the row 0;

(b) in response to processing the Push B instruction, the branch unit 112 writes B for storage in Addr of the row 1, and writes 0 as a then-current (pre-updated) value of Top for storage in Pred of the row 1; and (c) in response to processing the Push C instruction, the branch unit 112 writes C for storage in Addr of the row 2, and writes 0 as a then-current (pre-updated) value of Top for storage in Pred of the row 2.

Figure 3B:
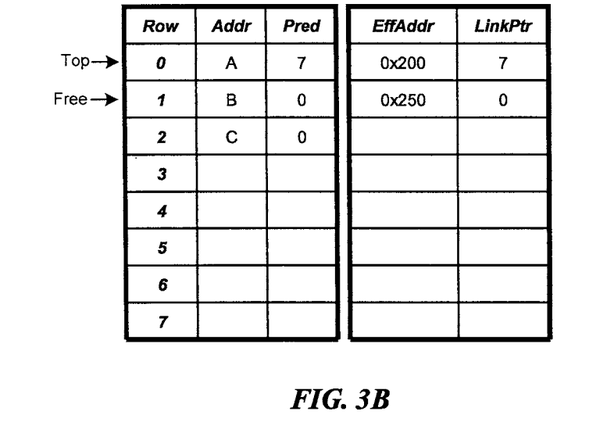
FIG. 3B is a conceptual illustration of the link stack, storing second information in the first example operation.

In the first example operation, in response to the fixed point unit 114 determining that the speculative branch is mispredicted (e.g., a predicted state of a branch condition is wrong for the branch conditional ("BC") instruction, or a predicted effective address of the branch's target is wrong for such instruction):

(a) the branch unit 112 restores Top to equal the LinkPtr saved in association with such instruction (so that such restored Top=0), without restoring a duplicate copy of the entire link stack, and without popping all information that was pushed (onto the link stack) as a result of such misprediction;

(b) the branch unit 112 restores Free to equal such restored Top+1 (so that such restored Free=1), unless the mispredicted state of the branch condition was against taking such branch; and (c) as shown in FIG. 3B, the branch unit 112 erases the EffAddr and LinkPtr values for the sequence of instructions that are stored at the addresses 0x280, 0x520, 0x550 and 0x5B0, because the sequencer unit 110 fetched such instructions in response to misprediction of the speculative branch (e.g., the mispredicted state of the branch condition or the mispredicted effective address of the branch's target).

Figure 4A:
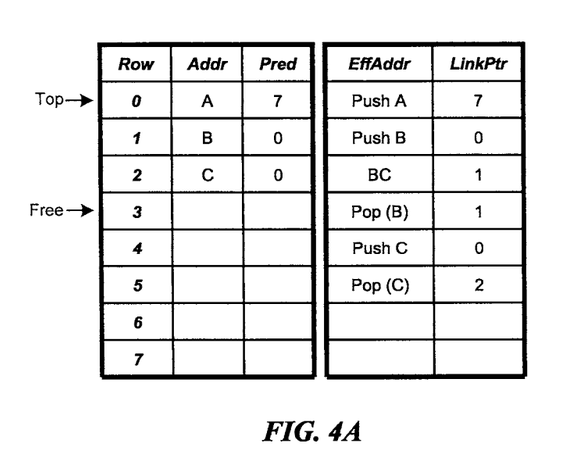
FIG. 4A is a conceptual illustration of the link stack, storing first information in a second example operation.

FIG. 4A is a conceptual illustration of the link stack, storing first information in a second example operation of the system 100.

In the second example operation, the system 100 processes the following sequence of instructions.

| Instruction |
|-------------|
| Push A      |
| Push B      |
| BC          |
| Pop (B)     |
| Push C      |
| Pop (C)     |
| Pop (B)     |
| Pop (A)     |
| Push D      |

In response to such processing, the branch unit 112 performs the following series of updates to Top and Free on an instruction-by-instruction basis, where initially: (a) Top=7; and (b) Free=0.

| Instruction | Updates to Top and Free |
|-------------|-------------------------|
| Push A      | Top = 0, Free = 1       |
| Push B      | Top = 1, Free = 2       |
| BC          | Top = 1, Free = 2       |
| Pop (B)     | Top = 0, Free = 2       |
| Push C      | Top = 2, Free = 3       |
| Pop (C)     | Top = 0, Free = 3       |
| Pop (B)     | Top = 0, Free = 2       |
| Pop (A)     | Top = 7, Free = 2       |
| Push D      | Top = 2, Free = 3       |

In response to the sequencer unit 110 fetching such instructions, the branch unit 112 saves a then-current (pre-updated) value of Top in association with such instructions' respective effective addresses, as shown in the EffAddr and LinkPtr columns of FIGS. 4A, 4B, 4C and 4D. For clarity, FIGS. 4A, 4B, 4C and 4D show the EffAddr by showing such instructions, instead of showing their actual effective addresses.

Further, as shown in FIG. 4A:

(a) in response to processing the Push A instruction, the branch unit 112 writes A for storage in Addr of the row 0, and writes 7 as a then-current (pre-updated) value of Top for storage in Pred of the row 0;

(b) in response to processing the Push B instruction, the branch unit 112 writes B for storage in Addr of the row 1, and writes 0 as a then-current (pre-updated) value of Top for storage in Pred of the row 1; and (c) in response to processing the Push C instruction, the branch unit 112 writes C for storage in Addr of the row 2, and writes 0 as a then-current (pre-updated) value of Top for storage in Pred of the row 2.

Figure 4B:
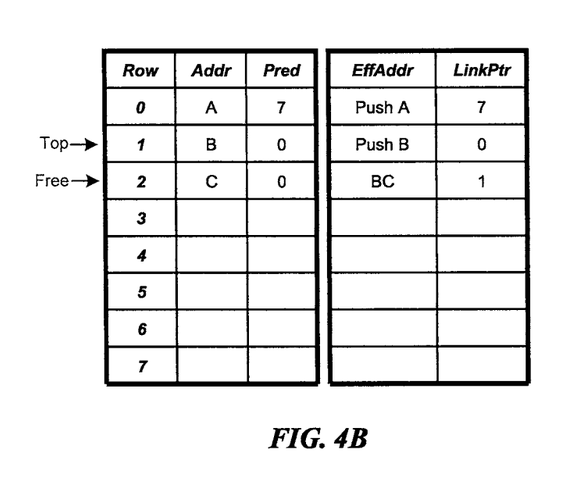
FIG. 4B is a conceptual illustration of the link stack, storing second information in the second example operation.

In the second example operation, in response to the fixed point unit 114 determining that the speculative branch is mispredicted (e.g., a predicted state of a branch condition is wrong for the branch conditional ("BC") instruction, or a predicted effective address of the branch's target is wrong for such instruction):

(a) the branch unit 112 restores Top to equal the LinkPtr saved in association with such instruction (so that such restored Top=1), without restoring a duplicate copy of the entire link stack, and without popping all information that was pushed (onto the link stack) as a result of such misprediction;

(b) the branch unit 112 restores Free to equal such restored Top+1 (so that such restored Free=2), unless the mispredicted state of the branch condition was against taking such branch; and (c) as shown in FIG. 4B, the branch unit 112 erases the EffAddr and LinkPtr values for the Pop (B), Push C and Pop (C) instructions, because the sequencer unit 110 fetched such instructions in response to misprediction of the speculative branch (e.g., the mispredicted state of the branch condition or the mispredicted effective address of the branch's target).

Figure 4C:
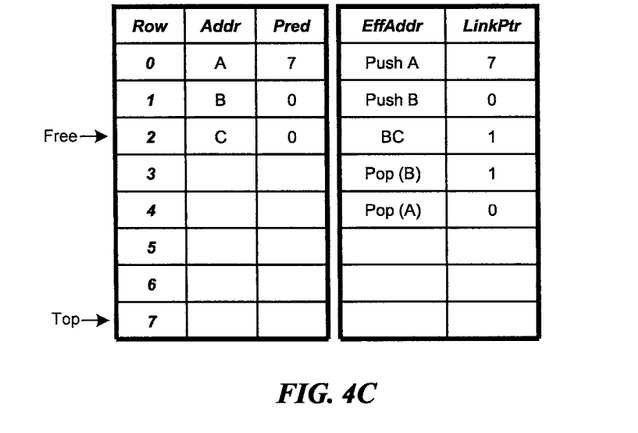
FIG. 4C is a conceptual illustration of the link stack, storing third information in the second example operation.

As shown in the EffAddr and LinkPtr columns of FIG. 4C: (a) in response to the sequencer unit 110 fetching the Pop (B) instruction, the branch unit 112 saves a then-current (pre-updated) value of Top in association with such instruction's respective effective address; and (b) in response to the sequencer unit 110 fetching the Pop (A) instruction, the branch unit 112 saves a then-current (pre-updated) value of Top in association with such instruction's respective effective address.

Figure 4D:
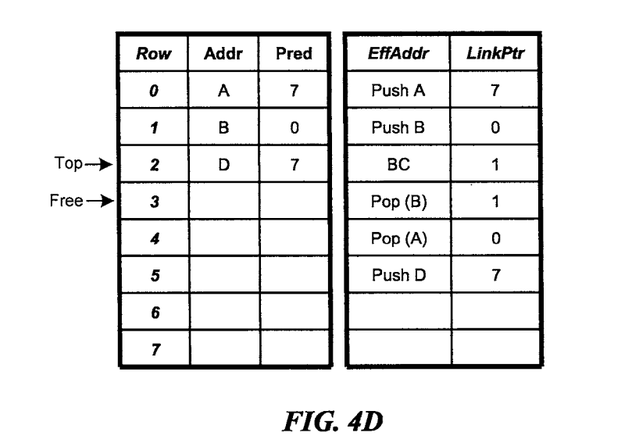
FIG. 4D is a conceptual illustration of the link stack, storing fourth information in the second example operation.

Further, as shown in the EffAddr and LinkPtr columns of FIG. 4D, in response to the sequencer unit 110 fetching the Push D instruction, the branch unit 112 saves a then-current (pre-updated) value of Top in association with such instruction's respective effective address.

Moreover, as shown in FIG. 4D, in response to processing the Push D instruction, the branch unit 112 writes D for storage in Addr of the row 2, and writes 7 as a then-current (pre-updated) value of Top for storage in Pred of the row 2. In that manner, the branch unit 112 overwrites previously stored information of the row 2.

Figure 5A:
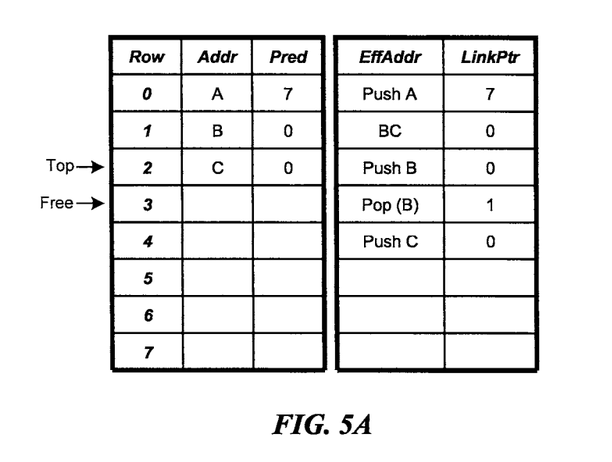
FIG. 5A is a conceptual illustration of the link stack, storing first information in a third example operation.

FIG. 5A is a conceptual illustration of the link stack, storing first information in a third example operation of the system 100.

In the third example operation, the system 100 processes the following sequence of instructions.

| Instruction |
| --- |
| Push A |
| BC |
| Push B |
| Pop (B) |
| Push C |
| Pop (A) |
| Push D |

In response to such processing, the branch unit 112 performs the following series of updates to Top and Free on an instruction-by-instruction basis, where initially: (a) Top=7; and (b) Free=0.

| Instruction | Updates to Top and Free |
| --- | --- |
| Push A | Top = 0, Free = 1 |
| BC | Top = 0, Free = 1 |
| Push B | Top = 1, Free = 2 |
| Pop (B) | Top = 0, Free = 2 |
| Push C | Top = 2, Free = 3 |
| Pop (A) | Top = 7, Free = 1 |
| Push D | Top = 1, Free = 2 |

Figure 5B:
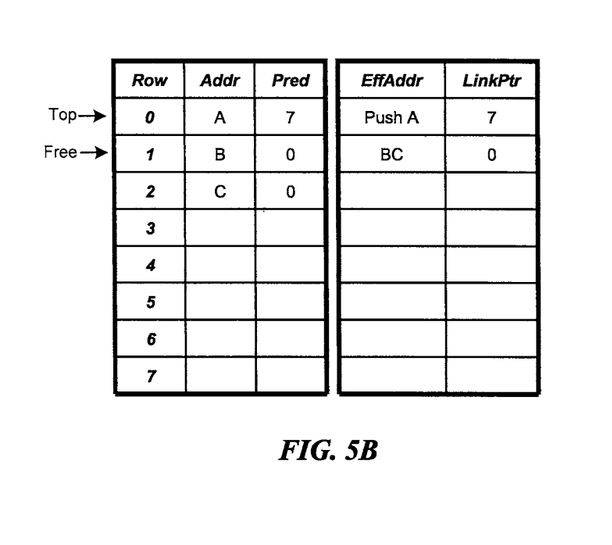
FIG. 5B is a conceptual illustration of the link stack, storing second information in the third example operation.
Figure 5C:
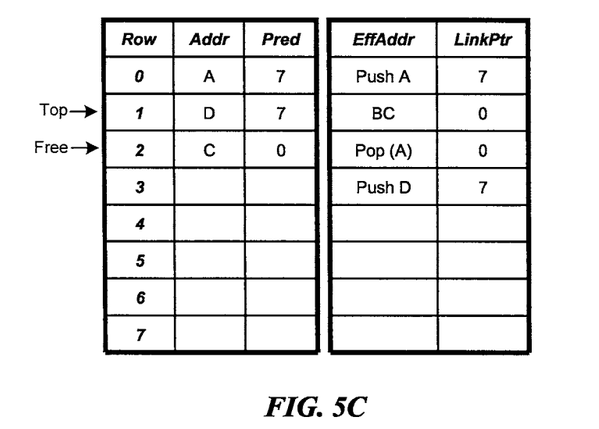
FIG. 5C is a conceptual illustration of the link stack, storing third information in the third example operation.

In response to the sequencer unit 110 fetching such instructions, the branch unit 112 saves a then-current (pre-updated) value of Top in association with such instructions' respective effective addresses, as shown in the EffAddr and LinkPtr columns of FIGS. 5A, 5B and 5C. For clarity, FIGS. 5A, 5B and 5C show the EffAddr by showing such instructions, instead of showing their actual effective addresses.

Further, as shown in FIG. 5A:

(a) in response to processing the Push A instruction, the branch unit 112 writes A for storage in Addr of the row 0, and writes 7 as a then-current (pre-updated) value of Top for storage in Pred of the row 0;

(b) in response to processing the Push B instruction, the branch unit 112 writes B for storage in Addr of the row 1, and writes 0 as a then-current (pre-updated) value of Top for storage in Pred of the row 1; and (c) in response to processing the Push C instruction, the branch unit 112 writes C for storage in Addr of the row 2, and writes 0 as a then-current (pre-updated) value of Top for storage in Pred of the row 2.

In the third example operation, in response to the fixed point unit 114 determining that the speculative branch is mispredicted (e.g., a predicted state of a branch condition is wrong for the branch conditional ("BC") instruction, or a predicted effective address of the branch's target is wrong for such instruction):

(a) the branch unit 112 restores Top to equal the LinkPtr saved in association with such instruction (so that such restored Top=0), without restoring a duplicate copy of the entire link stack, and without popping all information that was pushed (onto the link stack) as a result of such misprediction;

(b) the branch unit 112 restores Free to equal such restored Top+1 (so that such restored Free=1), unless the mispredicted state of the branch condition was against taking such branch; and (c) as shown in FIG. 5B, the branch unit 112 erases the EffAddr and LinkPtr values for the Push B, Pop (B) and Push C instructions, because the sequencer unit 110 fetched such instructions in response to misprediction of the speculative branch (e.g., the mispredicted state of the branch condition or the mispredicted effective address of the branch's target).

As shown in the EffAddr and LinkPtr columns of FIG. 5C: (a) in response to the sequencer unit 110 fetching the Pop (A) instruction, the branch unit 112 saves a then-current (pre-updated) value of Top in association with such instruction's respective effective address; and (b) in response to the sequencer unit 110 fetching the Push D instruction, the branch unit 112 saves a then-current (pre-updated) value of Top in association with such instruction's respective effective address.

Moreover, as shown in FIG. 5C, in response to processing the Push D instruction, the branch unit 112 writes D for storage in Addr of the row 1, and writes 7 as a then-current (pre-updated) value of Top for storage in Pred of the row 1. In that manner, the branch unit 112 overwrites previously stored information of the row 1.

Also, the link stack is suitable for the system 100 to use in processing a branch conditional from link register ("BCLR") instruction, which instructs the system 100 to conditionally branch its processing to an address that is popped from the then-current Top row of the link stack. Accordingly, in response to the system 100 speculatively branching its processing in response to the BCLR instruction, the branch unit 112: (a) writes suitable information (for storage in the EffAddr and LinkPtr columns discussed hereinabove) for saving a then-current (pre-updated) value of Top in association with the BCLR instruction's respective effective address; and (b) pops an address from the then-current Top row of the link stack by (i) reading Addr of the then-current Top row ("popped row") and (ii) updating Top to equal the value of such popped row's Pred.

In response to the fixed point unit 114 determining that the speculative branch is mispredicted (e.g., a predicted state of a branch condition is wrong for the BCLR instruction, or a predicted effective address of the branch's target is wrong for such instruction):

(a) the branch unit 112 restores Top to equal the LinkPtr saved in association with such instruction, without restoring a duplicate copy of the entire link stack, and without popping all information that was pushed (onto the link stack) as a result of such misprediction; and (b) the branch unit 112 updates Top to equal the value of the then-current Top row's Pred, unless the mispredicted state of the branch condition was in favor of taking such branch.

Further, the link stack is suitable for the system 100 to use in processing a branch conditional to link register ("BCL") instruction, which instructs the branch unit 112 to push a return address onto the link stack before the system 100 conditionally branches its processing to a different instruction sequence. The different instruction sequence concludes with a return instruction. In response to processing the return instruction at the end of the different instruction sequence, the system 100 returns its processing to the return address, which is popped by the branch unit 112 from the then-current Top row of the link stack. In one example, the return address is a location of an instruction that immediately follows the BCL instruction within a programmed sequence of instructions.

Accordingly, in response to the system 100 speculatively branching its processing in response to the BCL instruction, the branch unit 112: (a) writes suitable information (for storage in the EffAddr and LinkPtr columns discussed hereinabove) for saving a then-current (pre-updated) value of Top in association with the BCL instruction's respective effective address; and (b) pushes the return address (which is a location of an instruction that immediately follows the BCL instruction within a programmed sequence of instructions) onto the link stack by (i) writing the return address for storage (within the link stack) in Addr of the then-current Free row, (ii) writing a then-current value of Top for storage (within the link stack) in Pred of the then-current Free row, (iii) updating Top to equal a then-current value of Free, and (iv) updating Free to equal such updated Top+1.

In response to the fixed point unit 114 determining that the speculative branch is mispredicted (e.g., a predicted state of a branch condition is wrong for the BCL instruction, or a predicted effective address of the branch's target is wrong for such instruction):

(a) the branch unit 112 restores Top to equal the LinkPtr saved in association with such instruction, without restoring a duplicate copy of the entire link stack, and without popping all information that was pushed (onto the link stack) as a result of such misprediction; and (b) the branch unit 112 pushes the return address (which is a location of an instruction that immediately follows the BCL instruction within a programmed sequence of instructions) onto the link stack in the same manner as discussed hereinabove, unless the mispredicted state of the branch condition was in favor of taking such branch (in which case the branch unit 112 updates Free to equal such restored Top+1).

Moreover, the link stack is suitable for the system 100 to use in processing a branch conditional from link register & branch conditional to link register ("BCLRL") instruction, which instructs the system 100 to process a BCLR instruction (as discussed hereinabove) followed by a BCL instruction (as discussed hereinabove).

With the link stack of the branch unit 112: (a) in response to the system 100 speculatively branching its processing, the system 100 is not required to save a duplicate copy of the entire link stack; and (b) in response to determining that the speculative branch is mispredicted (e.g., the predicted state of such branch condition is wrong, or the predicted effective address of the branch's target is wrong), the system 100 is not required to pop (from the link stack) all information that was pushed (onto the link stack) as a result of such misprediction. Accordingly, with the link stack of the branch unit 112, the system 100 is able to: (a) speculatively branch its processing in response to one or more branch conditional instructions (e.g., in response to multiple branch conditional instructions at the same time, as discussed hereinabove in connection with BRN1, BRN2 and BRN3 of FIG. 2); and (b) recover from misprediction of one or more of such branches (e.g., a mispredicted state of a branch condition or a mispredicted effective address of a branch's target) in a relatively efficient manner.

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including, but not limited to, firmware, resident software, or microcode) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be used in the illustrative embodiment. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium (including, but not limited to, wireless, wireline, optical fiber cable, RF, or any suitable combination of the foregoing).

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer, and partly on a remote computer or entirely on the remote computer or server. The remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described with reference to flowchart illustrations and/or block diagrams of methods, apparatus (systems) and computer program products according to the illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions (which execute via the processor of the computer or other programmable data processing apparatus) are processable to cause performance of the functions/acts specified in the flowchart and/or block diagram block or blocks.

These computer program instructions may also be stored in a computer readable medium that can direct a computer, other programmable data processing apparatus, or other devices to operate in a particular manner, such that the instructions stored in the computer readable medium produce an article of manufacture, including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process, such that the instructions that execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to the illustrative embodiments. In this regard, each block in the flowchart or block diagrams may represent a module, segment, or portion of code, which includes one or more executable instructions for implementing the specified logical operation(s). In some alternative implementations, the operations noted in the block may occur out of the order noted in the Figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified operations or acts, or combinations of special purpose hardware and computer instructions.

The terminology used herein is for the purpose of describing particular embodiments only and is not intended to be limiting of the inventions. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the inventions in the form disclosed. Many modifications and variations will be apparent to those of ordinary skill in the art without departing from the scope and spirit of the inventions. The embodiment was chosen and described in order to best explain the principles of the inventions and the practical application, and to enable others of ordinary skill in the art to understand the inventions for various embodiments with various modifications as are suited to the particular use contemplated.

What is claimed is:

1. A method of operating a stack of information, wherein a first pointer is for pointing to a next-to-read location within the stack and a second pointer is for pointing to a next-to-write location within the stack, and wherein each stack entry includes an address field storing an operand of a push operation and an index field storing an index of a stack entry being a predecessor to the first pointer, and wherein the method is performed by an information handling system, the method comprising:
   pushing information onto the stack, wherein the pushing includes: saving a value of the first pointer, which points to a first location within the stack as being the next-to-read location; updating the first pointer so that it points to a second location within the stack as being the next-to-read location; and writing the information for storage at the second location; and
   popping the information from the stack, wherein the popping includes: reading the information from the second location as the next-to-read location; and restoring the first pointer to equal the saved value so that it points to the first location as being the next-to-read location.

2. The method of claim 1, wherein the value is a first value, wherein the information is first information, and comprising:
in response to processing a branch instruction, saving a second value of the first pointer, speculatively processing a target instruction, and performing at least one of: popping the first information from the stack; and pushing second information onto the stack;
determining whether speculatively processing the target instruction is mispredicted; and
in response to determining that speculatively processing the target instruction is mispredicted, restoring the first pointer to equal the saved second value.

3. The method of claim 2, and comprising:
in response to processing the branch instruction, popping the first information from the stack, wherein the first information includes an address of the target instruction.

4. The method of claim 2, and comprising:
in response to processing the branch instruction, pushing the second information onto the stack, wherein the second information includes a return address of an instruction for processing in response to a return instruction.

5. The method of claim 2, wherein the restoring comprises:
in response to determining that speculatively processing the target instruction is mispredicted, restoring the first pointer to equal the saved second value without restoring a duplicate copy of the entire stack.

6. The method of claim 2, wherein the restoring comprises:
in response to determining that speculatively processing the target instruction is mispredicted, restoring the first pointer to equal the saved second value without popping all information that was pushed onto the stack as a result of the misprediction.

7. The method of claim 2, wherein the branch instruction is a first branch instruction, and wherein the target instruction is a first target instruction, and comprising:
in response to processing a second branch instruction, yet before determining whether speculatively processing the first target instruction is mispredicted, saving a third value of the first pointer, speculatively processing a second target instruction, and performing at least one of: popping the first information from the stack; and pushing the second information onto the stack;
determining whether speculatively processing the second target instruction is mispredicted; and
in response to determining that speculatively processing the second target instruction is mispredicted, restoring the first pointer to equal the saved third value.

8. The method of claim 2, further comprising, in response to determining that speculatively processing the target instruction is mispredicted, restoring the second pointer to equal the saved second value +1.

9. The method of claim 1, wherein the pushing includes:
updating the second pointer so that it points to a third location within the stack.

10. A system for operating a stack of information, wherein a pointer is for pointing to a next-to-read location within the stack, and wherein each stack entry includes an address field storing an operand of a push operation and an index field storing an index of a stack entry being a predecessor to the pointer, the system comprising:
one or more execution units for pushing information onto the stack and for popping the information from the stack;
wherein the pushing includes: saving a value of the pointer, which points to a first location within the stack as being the next-to-read location; updating the pointer so that it points to a second location within the stack as being the next-to-read location; and writing the information for storage at the second location; and
wherein the popping includes: reading the information from the second location as the next-to-read location; and restoring the pointer to equal the saved value so that it points to the first location as being the next-to-read location.

11. The system of claim 10, wherein the value is a first value, wherein the information is first information, and wherein the execution units are for:
in response to processing a branch instruction, saving a second value of the pointer, speculatively processing a target instruction, and performing at least one of: popping the first information from the stack; and pushing second information onto the stack;
determining whether speculatively processing the target instruction is mispredicted; and
in response to determining that speculatively processing the target instruction is mispredicted, restoring the pointer to equal the saved second value.

12. The system of claim 11, wherein the execution units are for:
in response to processing the branch instruction, popping the first information from the stack, wherein the first information includes an address of the target instruction.

13. The system of claim 11, wherein the execution units are for:
in response to processing the branch instruction, pushing the second information onto the stack, wherein the second information includes a return address of an instruction for processing in response to a return instruction.

14. The system of claim 11, wherein the execution units are for:
in response to determining that speculatively processing the target instruction is mispredicted, restoring the pointer to equal the saved second value without restoring a duplicate copy of the entire stack.

15. The system of claim 11, wherein the execution units are for:
in response to determining that speculatively processing the target instruction is mispredicted, restoring the pointer to equal the saved second value without popping all information that was pushed onto the stack as a result of the misprediction.

16. The system of claim 11, wherein the branch instruction is a first branch instruction, and wherein the target instruction is a first target instruction, and wherein the execution units are for:
in response to processing a second branch instruction, yet before determining whether speculatively processing the first target instruction is mispredicted, saving a third value of the pointer, speculatively processing a second target instruction, and performing at least one of:
popping the first information from the stack; and pushing the second information onto the stack;
determining whether speculatively processing the second target instruction is mispredicted; and
in response to determining that speculatively processing the second target instruction is mispredicted, restoring the pointer to equal the saved third value.

17. The system of claim 11, wherein the pointer is a first pointer, wherein a second pointer is for pointing to a next-to-write location within the stack, and wherein the execution units are for:

in response to determining that speculatively processing the target instruction is mispredicted, restoring the second pointer to equal the saved second value +1.

18. The system of claim 10, wherein the pointer is a first pointer, and wherein a second pointer is for pointing to a next-to-write location within the stack, and wherein the pushing includes updating the second pointer so that it points to a third location within the stack.

19. A system for operating a stack of information, wherein a first pointer is for pointing to a next-to-read location within the stack, wherein a second pointer is for pointing to a next-to-write location within the stack, and wherein each stack entry includes an address field storing an operand of a push operation and an index field storing an index of a stack entry being a predecessor to the first pointer, and comprising:
  one or more execution units for pushing information onto the stack and for popping the information from the stack;
  wherein the pushing includes: saving a value of the first pointer, which points to a first location within the stack as being the next-to-read location; updating the first pointer so that it points to a second location within the stack as being the next-to-read location; writing the information for storage at the second location; and updating the second pointer so that it points to a third location within the stack, wherein the third location is adjacent to the second location; and
  wherein the popping includes: reading the information from the second location as the next-to-read location; and restoring the first pointer to equal the saved value so that it points to the first location as being the next-to-read location.

20. The system of claim 19, wherein the value is a first value, wherein the information is first information, and wherein the execution units are for:
  in response to processing a branch instruction, saving a second value of the first pointer, speculatively processing a target instruction, and performing at least one of: popping the first information from the stack; and pushing second information onto the stack;
  determining whether speculatively processing the target instruction is mispredicted; and
  in response to determining that speculatively processing the target instruction is mispredicted, restoring the first pointer to equal the saved second value, and restoring the second pointer to equal the saved second value +1, without restoring a duplicate copy of the entire stack and without popping all information that was pushed onto the stack as a result of the misprediction.

21. The system of claim 20, wherein the execution units are for:
  in response to processing the branch instruction, popping the first information from the stack, wherein the first information includes an address of the target instruction.

22. The system of claim 20, wherein the execution units are for:
  in response to processing the branch instruction, pushing the second information onto the stack, wherein the second information includes a return address of an instruction for processing in response to a return instruction.

23. The system of claim 20, wherein the branch instruction is a first branch instruction, and wherein the target instruction is a first target instruction, and wherein the execution units are for:
  in response to processing a second branch instruction, yet before determining whether speculatively processing the first target instruction is mispredicted, saving a third value of the first pointer, speculatively processing a second target instruction, and performing at least one of:
  popping the first information from the stack; and pushing the second information onto the stack;
  determining whether speculatively processing the second target instruction is mispredicted; and
  in response to determining that speculatively processing the second target instruction is mispredicted, restoring the first pointer to equal the saved third value, and restoring the second pointer to equal the saved third value +1.

* * * * *